United States Patent
Tsao et al.

(10) Patent No.: US 10,701,074 B2
(45) Date of Patent: Jun. 30, 2020

(54) INTERNET-OF-THINGS READING DEVICE, METHOD OF SECURE ACCESS, AND CONTROL CENTER APPARATUS

(71) Applicant: Wistron Corporation, New Taipei (TW)

(72) Inventors: Wen-Chun Tsao, New Taipei (TW); Yao-Tsung Chang, New Taipei (TW)

(73) Assignee: Wistron Corporation, New Taipei (TW)

(*) Notice: Subject to any disclaimer, the term of this patent is extended or adjusted under 35 U.S.C. 154(b) by 491 days.

(21) Appl. No.: 15/473,612

(22) Filed: Mar. 30, 2017

(65) Prior Publication Data
US 2018/0191719 A1 Jul. 5, 2018

(30) Foreign Application Priority Data
Jan. 5, 2017 (TW) .............................. 106100274 A

(51) Int. Cl.
*H04L 29/06* (2006.01)
*H04L 9/32* (2006.01)

(52) U.S. Cl.
CPC .......... *H04L 63/0884* (2013.01); *H04L 9/321* (2013.01); *H04L 9/3226* (2013.01);
(Continued)

(58) Field of Classification Search
CPC ... H04L 63/0884; H04L 9/321; H04L 9/3226; H04L 63/083; H04L 63/0876; H04L 2209/805
(Continued)

(56) References Cited

U.S. PATENT DOCUMENTS 9,054,961 B1 * 6/2015 Kim ................ H04L 41/0806
9,589,397 B1 * 3/2017 Christopher .......... H04L 9/0863
(Continued)

FOREIGN PATENT DOCUMENTS

CN 101931533 12/2010
CN 104052742 9/2014

OTHER PUBLICATIONS

"Office Action of Taiwan Counterpart Application," dated Mar. 23, 2018, p. 1-p. 7, in which the listed references were cited.
(Continued)

*Primary Examiner* — Farid Homayounmehr
*Assistant Examiner* — Sanchit K Sarker
(74) *Attorney, Agent, or Firm* — JCIPRNET

(57) ABSTRACT

An Internet-of-Things (IoT) reading device, a method of secure access using the same, and a control center apparatus are provided. The Internet-of-Things reading device includes a network interface and a processor. The network interface is configured to communicate with an Internet-of-Things device located in a communication range. The processor actively obtains, by using the network interface, a device identification code from the Internet-of-Things device, and determines whether the Internet-of-Things device is an approved device according to the device identification code. The processor transmits the device identification code to a control center apparatus to obtain an authentication password while the Internet-of-Things device is identified as the approved device, and transmits the authentication password to the Internet-of-Things device to perform an authentication process by the Internet-of-Things device. The processor obtains, after the authentication process is completed, information from the Internet-of-Things device by using a reading request.

11 Claims, 4 Drawing Sheets

(52) U.S. Cl.
CPC ........ *H04L 63/083* (2013.01); *H04L 63/0876* (2013.01); *H04L 2209/805* (2013.01)

(58) Field of Classification Search
USPC .......................................................... 726/7
See application file for complete search history.

(56) References Cited

U.S. PATENT DOCUMENTS

| | | | |
|---|---|---|---|
| 2015/0310185 A1* | 10/2015 | Shah | G06F 19/3462 340/10.6 |
| 2016/0128043 A1* | 5/2016 | Shuman | H04W 72/044 370/331 |
| 2016/0142398 A1 | 5/2016 | Lin | |
| 2016/0261458 A1* | 9/2016 | Huang | H04L 43/16 |
| 2016/0323257 A1* | 11/2016 | Kang | H04L 63/08 |

OTHER PUBLICATIONS

"Office Action of China Counterpart Application", dated Apr. 29, 2020, p. 1-p. 11.

\* cited by examiner

INTERNET-OF-THINGS READING DEVICE, METHOD OF SECURE ACCESS, AND CONTROL CENTER APPARATUS

CROSS-REFERENCE TO RELATED APPLICATION

This application claims the priority benefit of Taiwan application serial no. 106100274, filed on Jan. 5, 2017. The entirety of the above-mentioned patent application is hereby incorporated by reference herein and made a part of this specification.

BACKGROUND OF THE INVENTION

1. Field of the Invention

The present invention generally relates to an information transmission technology related to an Internet of Things (Internet of Things; IoT), in particular, to an Internet-of-Things reading device, a method of secure access, and a control center apparatus.

2. Description of Related Art

An Internet of Things (Internet of Things; IoT) refers to a data carrier such as an internet network and a conventional telecommunications network, and can enable devices connected to the IoT (referred to as IoT devices) to be connected to each other, and communicate with each other. Generally, different types of sensors or cameras may be disposed in the Internet-of-Things devices. Vendors may make use of the Internet-of-Things devices in combination with center devices in the IoT to perform technologies such as cloud calculation and big data analytics, so as to invent diverse function applications. In a home environment, many IoT devices having sensing functions (such as a network camera, an electronic doorbell, a temperature sensor, a smoke sensor, and an advanced appliance) are designed as simple and flexible, but chips in the IoT devices do not have enough calculation capabilities. Consequently, it is difficult for the IoT devices to actively communicate with other devices in the IoT. In addition, if information in the IoT devices can be easily read by other apparatuses, it is quite possible that network information security is threatened.

Therefore, how to properly use IoT devices having sensing functions to collect information, so as to implement function applications of an Internet of Things in different area environments and prevent the information from being theft and used by other people, will be a common problem in Internet-of-Things communication technologies.

SUMMARY OF THE INVENTION

The present invention provides an Internet-of-Things reading device, a method of secure access, and a control center apparatus, and can ensure network information security in an Internet of Things by using multiple identification processes and a dynamic encryption technology.

The Internet-of-Things reading device in the present invention includes a network interface and a processor. The network interface is configured to communicate with an Internet-of-Things device located in a communication range of the Internet-of-Things reading device. The processor is coupled with the network interface. The processor actively obtains, by using the network interface, a device identification code from the Internet-of-Things device, and determines whether the Internet-of-Things device is an approved device according to the device identification code. When the Internet-of-Things device is identified as the approved device, the processor transmits the device identification code to the control center apparatus in an Internet of Things to obtain the authentication password. The processor transmits the authentication password to the Internet-of-Things device, so that the Internet-of-Things device performs an authentication process. And, the processor obtains, after the authentication process is completed, information of the Internet-of-Things device by using a reading request.

The method of secure access to the Internet-of-Things device in the present invention is applicable to the Internet-of-Things reading device. The method of secure access includes the following steps: actively communicating with an Internet-of-Things device located in a communication range of the Internet-of-Things reading device to obtain a device identification code of the Internet-of-Things device; determining, according to the device identification code, whether the Internet-of-Things device is an approved device; transmitting, when the Internet-of-Things device is identified as the approved device, a center apparatus in the Internet of Things to the device identification code to obtain an authentication password; transmitting the authentication password to the Internet-of-Things device, so that the Internet-of-Things device performs an authentication process; and obtaining, after the authentication process is completed, information of the Internet-of-Things device by using a reading request.

The control center apparatus in the Internet of Things in the present invention includes a network access module and a controller. The network access module is configured to communicate with an Internet-of-Things reading device. The controller is coupled with the network access module. The controller obtains, by using the Internet-of-Things reading device, a device identification code of an Internet-of-Things device; performing, by using the device identification code, an authentication process of the Internet-of-Things device to generate an authentication password corresponding to the device identification code; and transmitting the authentication password to the Internet-of-Things reading device. The Internet-of-Things reading device transmits the authentication password to the Internet-of-Things device, so that the Internet-of-Things device performs the authentication process; and after the authentication process is completed, the Internet-of-Things reading device obtains information of the Internet-of-Things device by using a reading request.

Based on the foregoing, the Internet-of-Things reading device in the embodiments of the present invention is configured to communicate with surrounding Internet-of-Things devices, but the Internet-of-Things reading device itself needs, before reading information of an Internet-of-Things device, to obtain a corresponding device identification code from the Internet-of-Things device; and transmit the device identification code to a control center apparatus in the Internet of Things, so that the Internet-of-Things reading device obtains an authentication password of the Internet-of-Things device. In some embodiments, the Internet-of-Things reading device needs to perform reader authentication on the control center apparatus in the Internet of Things, so that the control center apparatus determines whether the Internet-of-Things reading device properly reads information of the Internet-of-Things device. Therefore, by means of the Internet-of-Things reading device, the method of secure access, and the control center apparatus in the embodiments of the present invention, multiple authentication processes and a dynamic encryption technology may be used to ensure network information security in an Internet of Things, so as to prevent information in an Internet-of-Things device from being theft by other people by using an Internet-of-Things reading device.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
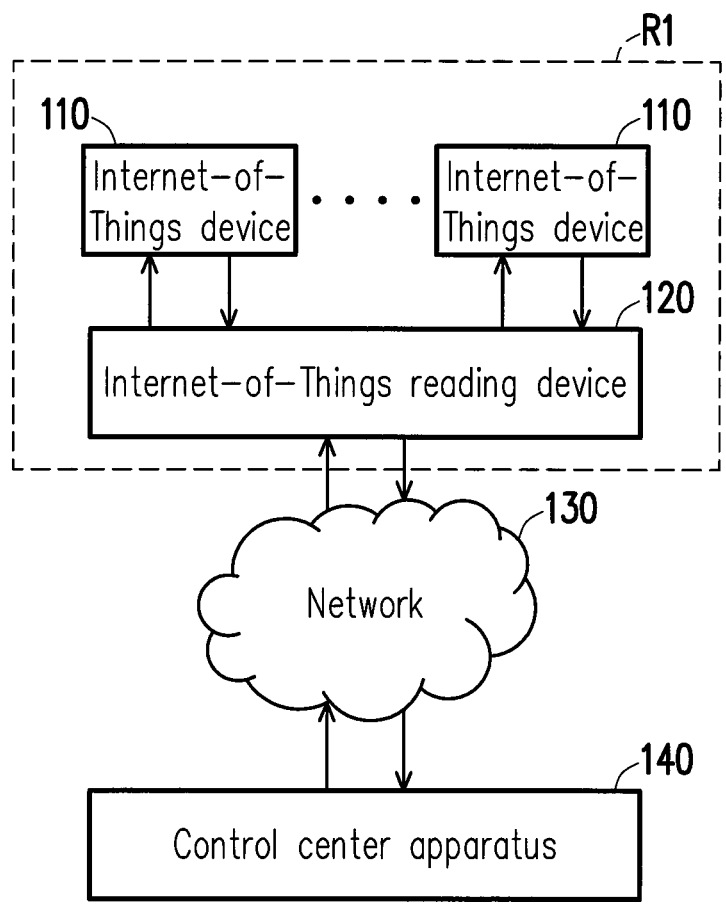
FIG. 1 is a schematic diagram of devices in an Internet of Things according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Figure 2:
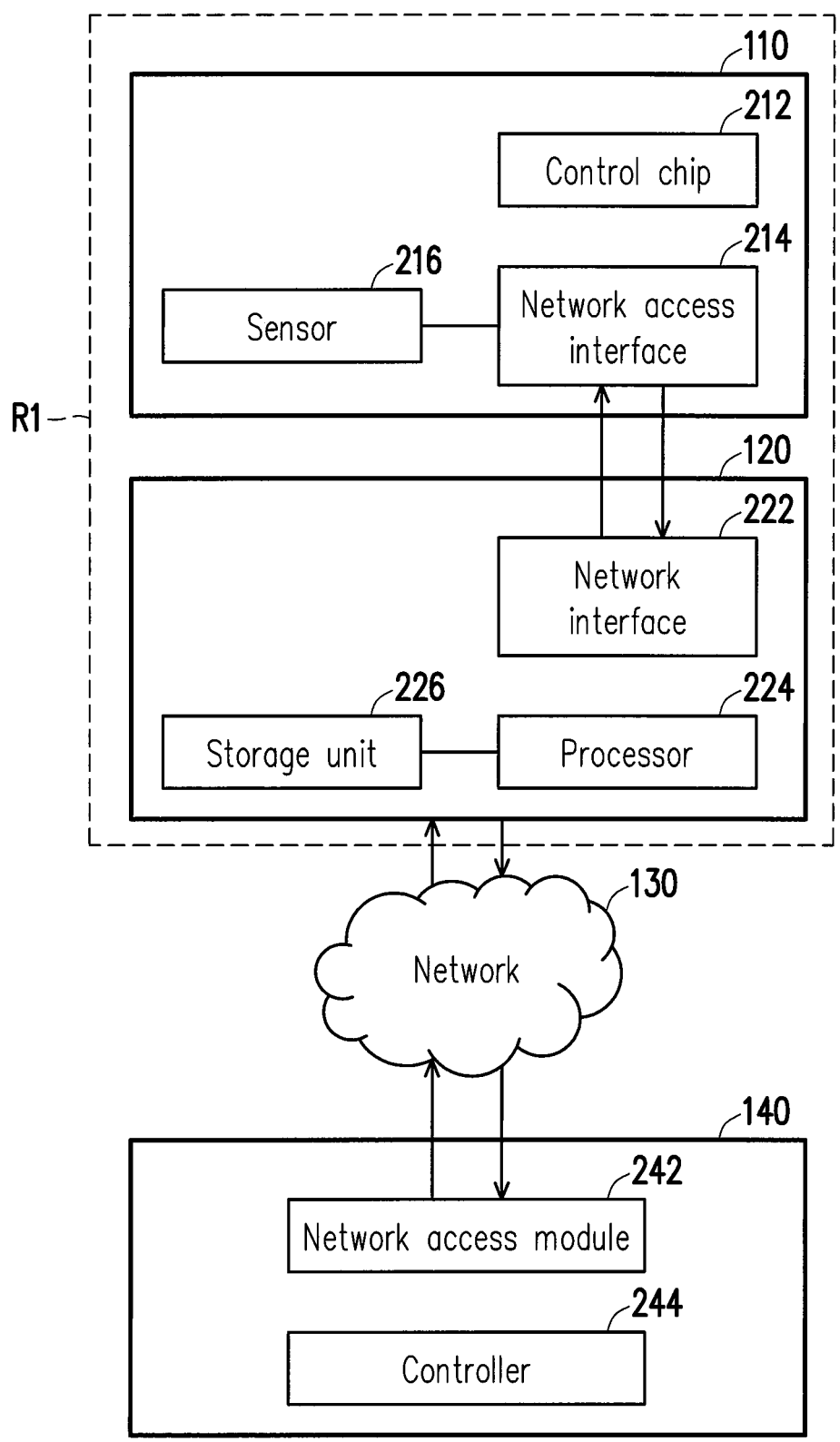
FIG. 2 is a block diagram of functions of devices in an Internet of Things 100.

FIG. 1 is a schematic diagram of devices in an Internet of Things 100 according to an embodiment of the present invention. FIG. 2 is a block diagram of functions of the devices in the Internet of Things 100. Referring to FIG. 1 and FIG. 2, the Internet of Things 100 includes one or more Internet-of-Things (IoT) devices 110, an Internet-of-Things reading device 120, and a control center apparatus 140 in a network 130. To clearly show function components of the IoT device 110 in FIG. 2, FIG. 2 shows only one IoT device 110, but a quantity of the IoT devices 110 is not limited thereof. The control center apparatus 140 may be a cloud apparatus such as a cloud server and a profile center.

The IoT device 110 includes a control chip 212, a network access interface 214, and a sensor 216. The IoT device 110 in the present embodiment may have diverse sensors, so as to collect information corresponding to the sensors, for example, a temperature, humidity, a camera image, and smoke. The present embodiment does not limit a type of the sensor 216. Because the IoT devices 110 are mainly configured to sense related information and transmit the information to the IoT reading device 120, the control chip 212 and the network access interface 214 do not need quite powerful data calculation capabilities. In addition, the IoT devices 110 may be enabled to not to actively communicate with other devices, or not to actively identify other devices in the IoT (for example, the IoT reading device 120, and the control center apparatus 140). On the contrary, the IoT devices 110 reactively communicate with the IoT reading device 120 until the IoT reading device 120 sends a detection request or connection request. In addition, when communicating with the IoT reading device 120 for the first time, the IoT devices 110 merely provide a device identification code thereof to the IoT reading device 120, and do not actively and directly provide detected information for the IoT reading device 120.

The IoT reading device 120 in FIG. 2 includes a network interface 222, a processor 224, and a storage unit 226. The processor 224 is coupled with the network interface 222. The IoT reading device 120 may further include a storage unit 226 (for example, a fast access memory). The storage unit 226 may be configured to store or temporarily store a device identification code of the IoT device 110, an authentication password, or sensing data of the IoT device 110. The IoT reading device 120 in the present embodiment mainly communicates, by using the network interface 222, with the IoT device 110 located in a communication range R1 of the IoT reading device 120. However, to avoid that the IoT reading device 120 can easily obtain information in the IoT device 110, the IoT reading device 120 need to verify that "the IoT reading device 120 can read the IoT device 110" by using the control center apparatus 140 in the network 130. The control center apparatus 140 in the network 130 includes a network access module 242 and a controller 244.

In the present embodiment, the control chip 212, the processor 224, or the controller 244 may be a processor for general objectives, an application specific integrated circuit (application specific integrated circuit; ASIC), an embedded processor (embedded processor), a field programmable gate array (field programmable gate array; FPGA), a microcontroller, or other similar components. The network access interface 214, the network interface 222, or the network access module 242 may be an antenna in combination with a control chip used to control the antenna, a network access chip, or a network card.

Figure 3:
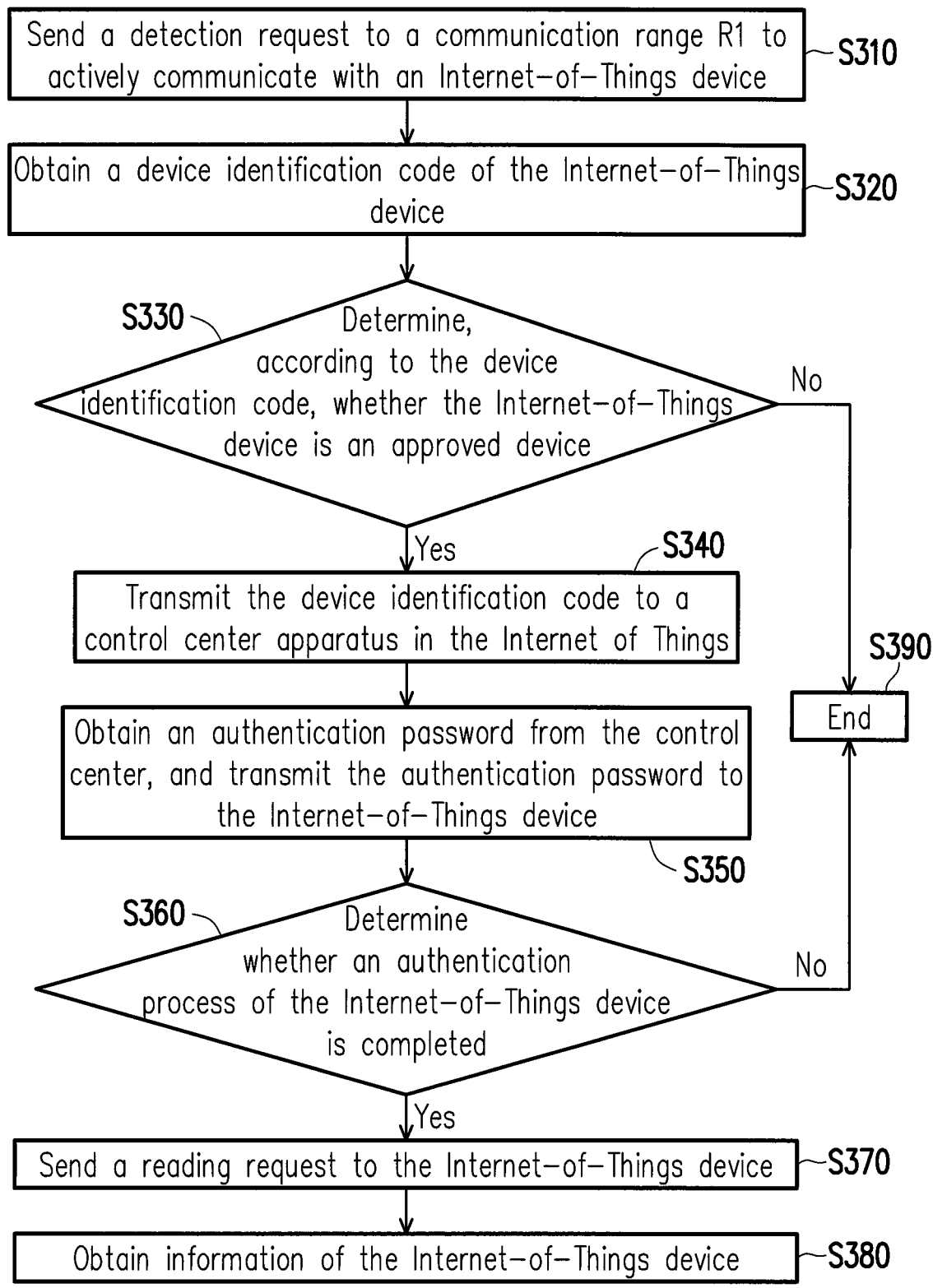
FIG. 3 is a flowchart of a method of secure access of an Internet-of-Things device according to an embodiment of the present invention.

FIG. 3 is a flowchart of a method of secure access to an Internet-of-Things device according to an embodiment of the present invention, and the method of secure access is applicable to the Internet-of-Things 100 shown in FIG. 1 and FIG. 2 and devices of the Internet-of-Things 100. Referring to FIG. 2 and FIG. 3, in step S310, the processor 224 in the IoT reading device 120 sends a detection request to the communication range R1 by using the network interface 222, to actively communicate with the IoT device 110. When receiving the foregoing detection request, the IoT device 110 performs step S320. The IoT device 110 uploads a device identification code corresponding to the IoT device 110 to the IoT reading device 120, so that the IoT reading device 120 obtains the device identification code. Step S310 and step S320 may be that, the IoT reading device 120 actively obtains the device identification code of the IoT device 110 from the IoT device 110.

In step S330, the processor 224 in the IoT reading device 120 may determine, according to the device identification code, whether the IoT device 110 is an access device approved by the IoT reading device 120 (referred to as an approved device). In details, the IoT reading device 120 may pre-store multiple preset device identification codes in the storage unit 226 to form lists or a databases, so as to search for the lists or a databases according to the device identification codes of the IoT device 110. Therefore, the IoT reading device 120 can determine whether the IoT device 110 in communication is an IoT device that is allowed to read.

If it is determined that the IoT device 110 is not the foregoing approved device, step S390 is performed to end the communication. On the contrary, if it is determined that the IoT device 110 is an approved device, step S340 is performed. The processor 224 in the IoT reading device 120 transmits the device identification code to the control center apparatus 140 in the Internet of Things, so as to obtain an authentication password corresponding to the IoT device 110. In step S350, the control center apparatus 140 performs an authentication process according to the device identification code transmitted from the IoT reading device 120. After it is determined that the IoT reading device 120 is an IoT device approved by the control center apparatus 140, an authentication password corresponding to the device identification code is generated, and the authentication password is uploaded to the IoT reading device 120. When the IoT reading device 120 receives the authentication password, the authentication password is transmitted to the IoT device 110, so that the IoT device 110 performs the authentication process.

In step S360, the IoT reading device 120 determines whether authentication process completion information from the IoT device 110 is received, so as to determine whether the authentication process of the IoT device 110 is completed. When the authentication process of the IoT device 110 is completed, the authentication process completion information is sent to the IoT reading device 12. That is, after the authentication process of the IoT device 110 is completed, step S370 is performed after step S360. The IoT reading device 120 sends a reading request to the IoT device 110, so as to obtain sensing information in the IoT device 110. After multiple authentication processes from the foregoing step S310 to step S360, in step S380, the IoT device 110 provides information of itself for the IoT reading device 120.

Therefore, the IoT reading device 120 may be used to collect sensing information of the IoT device 110, and transmit the sensing information to the control center apparatus 140. In another word, in this embodiment of the present invention, the identification process performed on the IoT device 101 is performed by the control center apparatus 140, and the IoT reading device 120 merely transfers the device identification code of the IoT device 101, so as to ensure network information security in the Internet of Things 100.

Figure 4:
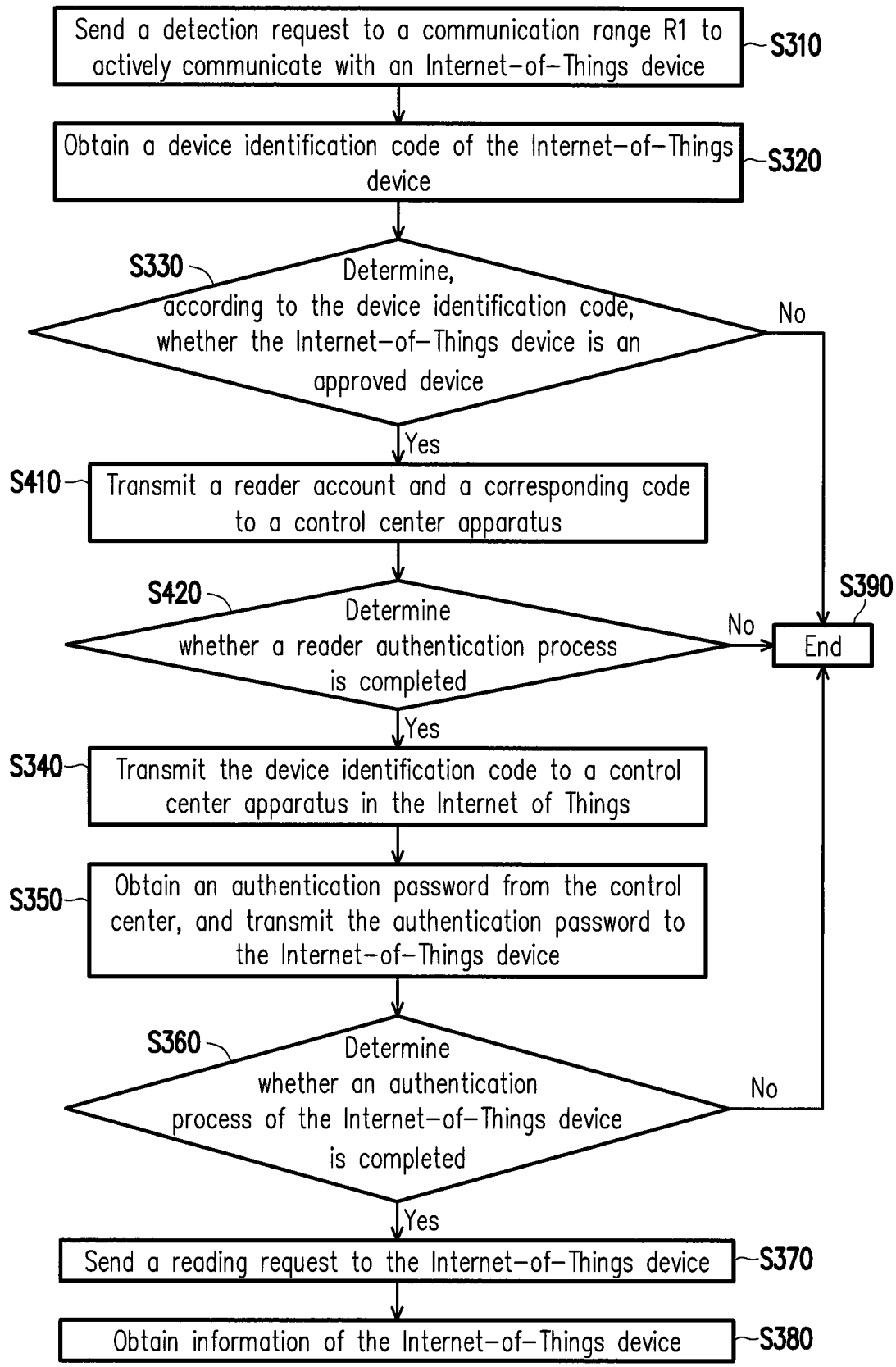
FIG. 4 is a flowchart of a method of secure access of an Internet-of-Things device according to another embodiment of the present invention.

FIG. 4 is a flowchart of a method of secure access of an Internet-of-Things device according to another embodiment of the present invention. A difference between FIG. 3 and FIG. 4 is that, step S410 and step S420 are added after step S330 in FIG. 4. Referring to FIG. 2 and FIG. 4, after the IoT reading device 120 determines that the IoT device 110 in communication is an IoT device that is allowed to read, step S410 is performed. The processor 224 of the IoT reading device 120 transmits, to the control center apparatus 140, a reader account and a password corresponding to the IoT reading device 120, so that the control center apparatus 140 performs a reader authentication process on the IoT reading device 120. In step S420, the IoT reading device 120 determines, according to information uploaded by the control center apparatus 140, whether the reader authentication process is completed. When step S420 is yes, it is indicated that the reader authentication process is completed, and the processor 224 of the IoT reading device 120 performs step S340. In this case, by means of step S410 and step S420, information security of the Internet of Things 100 is ensured by using another manner. In some embodiments, step S410 and step S420 may be implemented before step S310. The embodiments of the present invention do not limit an actual operation order of step S410 and step S420. Refer to the description in the foregoing embodiments for other steps in FIG. 4.

It should be noted that, because the IoT device 110 does not actively communicate with the IoT reading device 120 and the control center apparatus 140, the IoT device 110 may determine, by using the same encryption algorithm as the control center apparatus 140, whether the authentication password received in step S350 to step S360 is correct. In some embodiments, a current authentication password is calculated by using the encryption algorithm of the IoT device 110 according to a former authentication password. In some embodiments, the IoT device 110 and the control center apparatus 140 may simultaneously use a dynamic encryption algorithm, for example, a dynamic encryption algorithm that uses a time or a particular value as a random seed. Therefore, an authentication password recorded in the IoT device 110 is difficult to be easily obtained by people who wants to steal information, thereby improving information security.

Based on the foregoing, the Internet-of-Things reading device in the embodiments of the present invention is configured to communicate with surrounding Internet-of-Things devices, but the Internet-of-Things reading device itself needs, before reading information of an Internet-of-Things device, to obtain a corresponding device identification code from the Internet-of-Things device; and transmit the device identification code to a control center apparatus in the Internet of Things, so that the Internet-of-Things reading device obtains an authentication password of the Internet-of-Things device. In some embodiments, the Internet-of-Things reading device needs to perform reader authentication on the control center apparatus in the Internet of Things, so that the control center apparatus determines whether the Internet-of-Things reading device properly reads information of the Internet-of-Things device. Therefore, by means of the Internet-of-Things reading device, the method of secure access, and the control center apparatus in the embodiments of the present invention, multiple authentication processes and a dynamic encryption technology may be used to ensure network information security in the Internet of Things, so as to prevent information in an Internet-of-Things device from being theft by other people by using an Internet-of-Things reading device.

The present invention is disclosed by using the foregoing embodiments, but the embodiments are not intended to limit the present invention. Any person of ordinary skill in the art may make some changes and modifications without departing from the spirit and scope of the present invention, and therefore the protection scope of the present invention conforms to the defined patent scope in the appendix.

What is claimed is:

1. An Internet-of-Things (IoT) reading device, comprising:
   a network interface, configured to communicate with an Internet-of-Things device located in a communication range of the Internet-of-Things reading device; and
   a processor, coupled with the network interface, and configured to obtain, by using the network interface, a device identification code from the Internet-of-Things device, and determine whether the Internet-of-Things device is an approved device according to the device identification code, wherein when the Internet-of-Things device communicates the Internet-of-Things reading device on a first connection for identification, the Internet-of-Things device provides the device identification code of the Internet-of-Things device to the Internet-of-things reading device, and does not provide information of the Internet-of-Things device sensed by the Internet-of-Things device to the Internet-of-Things reading device when communicating on the first connection for identification;

transmit the device identification code to a control center apparatus to obtain an authentication password while the Internet-of-Things device is identified as the approved device; and transmit the authentication password to the Internet-of-Things device to perform an authentication process by the Internet-of-Things device;

send a reading request to the internet-of-things device after the authentication process is completed; and obtain the information of the Internet-of-Things device in response to the reading request, wherein the Internet-of-Things device does not actively communicate with other apparatuses on the first connection for identification.

2. The Internet-of-Things reading device according to clai further comprising:

a storage unit, configured to store or temporarily store the device identification code of the Internet-of-Things device, the authentication password, or the sensing data of the Internet-of-Things device.

3. The Internet-of-Things reading device according to claim 1, wherein the Internet-of-Things device and the control center apparatus comprises a same encryption algorithm, to determine whether the authentication password is correct.

4. The Internet-of-Things reading device according to claim 3, wherein the encryption algorithm is a dynamic encryption algorithm.

5. The Internet-of-Things reading device according to claim 1, wherein the processor transmits a reader account and a corresponding password to the control center apparatus, so that the control center apparatus performs a reader authentication process on the Internet-of-Things reading device; and after the reader authentication process is completed, the processor transmits the device identification code to the control center apparatus to obtain the authentication password.

6. A method of secure access to an Internet-of-Things device, applicable to an Internet-of-Things reading device, wherein the method of secure access comprises:

actively communicating, by a processor, with an Internet-of-Things device located in a communication range of the Internet-of-Things reading device to obtain a device identification code of the Internet-of-Things device, wherein when the Internet-of-Things device communicates the Internet-of-Things reading device on a first connection for identification, the Internet-of-Things device provides the device identification code of the Internet-of-Things device to the Internet-of-things reading device, and does not provide information of the Internet-of-Things device sensed by the Internet-of-Things device to the Internet-of-Things reading device when communicating on the first connection for identification;

determining, according to the device identification code by a processor, whether the Internet-of-Things device is an approved device;

transmitting, when the Internet-of-Things device is identified as the approved device, the device identification code to a center apparatus in the Internet of Things by a processor to obtain an authentication password;

transmitting, by a processor, the authentication password to the Internet-of-Things device, so that the Internet-of-Things device performs an authentication process; and obtaining, after the authentication process is completed, information of the Internet-of-Things device by using a reading request by a processor, wherein the Internet-of-Things device does not actively communicate with other apparatuses on the first connection for identification.

7. The method of secure access to an Internet-of-Things device according to claim 6, further comprising:

transmitting a reader account and a corresponding password to the control center apparatus, so that the control center apparatus performs a reader authentication process on the Internet-of-Things reading device; and transmitting, after the reader authentication process is completed, the device identification code to the control center apparatus to obtain the authentication password of the Internet-of-Things device.

8. The method of secure access to an Internet-of-Things device according to claim 6, wherein the Internet-of-Things device does not actively communicate with other apparatuses.

9. The method of secure access to an Internet-of-Things device according to claim 6, further comprising:

determining, by the Internet-of-Things device and the control center apparatus by using a same encryption algorithm, whether the authentication password is correct.

10. A control center apparatus in the Internet of Things, comprising:

a network access module, configured to communicate with an Internet-of-Things reading device; and a controller, coupled with the network access module, wherein the controller obtains, by using an Internet-of-Things reading device, a device identification code of an Internet-of-Things device; performs an authentication process of the Internet-of-Things device according to the device identification code, to generate an authentication password corresponding to the device identification code; and transmits the authentication password to the Internet-of-Things reading device, wherein when the Internet-of-Things device communicates the Internet-of-Things reading device on a first connection for identification, the Internet-of-Things device provides the device identification code of the Internet-of-Things device to the Internet-of-things reading device, and does not provide information of the Internet-of-Things device sensed by the Internet-of-Things device to the Internet-of-Things reading device when communicating on the first connection for identification; and the Internet-of-Things reading device transmits the authentication password to the Internet-of-Things device, so that the Internet-of-Things device performs an authentication process; and after the authentication process is completed, the Internet-of-Things reading device obtains information of the Internet-of-Things device by using a reading request, wherein the Internet-of-Things device does not actively communicate with other apparatuses for the first connection for identification.

11. The control center apparatus of the IoT according to claim 10, wherein the controller obtains a reader account and a corresponding password that are transmitted from the Internet-of-Things reading device; and allows, after the reader authentication process is completed, the Internet-of-Things reading device to transmit the device identification code corresponding to the Internet-of-Things device to the control center apparatus.

\* \* \* \* \*